(12) United States Patent
Chakar et al.

(10) Patent No.: US 6,387,211 B1
(45) Date of Patent: May 14, 2002

(54) METHODS FOR REDUCING FLUORESCENCE IN PAPER-CONTAINING SAMPLES

(75) Inventors: Fadi Selim Chakar, Atlanta; Arthur Jonas Ragauskas, Lawrenceville, both of GA (US)

(73) Assignee: Institute of Paper Science and Technology, Inc., Atlanta, GA (US)

(*) Notice: Subject to any disclaimer, the term of this patent is extended or adjusted under 35 U.S.C. 154(b) by 0 days.

(21) Appl. No.: 09/888,861

(22) Filed: Jun. 25, 2001

Related U.S. Application Data

(62) Division of application No. 09/364,459, filed on Jul. 30, 1999, now Pat. No. 6,294,097.

(51) Int. Cl.[7] .................................................. D21B 1/16
(52) U.S. Cl. ...................... 162/5; 162/6; 162/8; 162/65; 162/72; 162/78
(58) Field of Search ............................... 162/4, 5, 6, 7, 162/8, 65, 72, 78

(56) References Cited

U.S. PATENT DOCUMENTS

| | | | |
|---|---|---|---|
| 4,478,747 A | 10/1984 | Crawford et al. | 435/72 |
| 4,713,336 A | 12/1987 | Srinivasan et al. | 435/155 |
| 5,116,746 A | 5/1992 | Bernier et al. | 435/172.3 |
| 5,232,845 A | 8/1993 | Crawford et al. | 435/189 |
| 5,451,514 A | 9/1995 | Boudet et al. | 435/172.3 |
| 5,691,193 A | 11/1997 | Paice et al. | 435/278 |
| 5,712,107 A | 1/1998 | Nichols | 435/15 |
| 5,876,625 A * | 3/1999 | Collins et al. | 252/186.33 |
| 5,888,787 A * | 3/1999 | Chen et al. | 435/147 |
| 5,908,472 A * | 6/1999 | Vollmond | 8/102 |

FOREIGN PATENT DOCUMENTS

| | | |
|---|---|---|
| CA | 1258437 | 8/1989 |
| CA | 2005597 | 6/1990 |
| JP | 2-160984 | 6/1990 |
| JP | 11-058790 | 3/1999 |
| WO | WO 94/29510 | 12/1994 |
| WO | WO 97/00834 | 1/1997 |

OTHER PUBLICATIONS

Debreuil, "Introduction to Fluorescence in Fiber Recycling," *Progress in Paper Recycling*, Aug. 1995, 98–108.

Roy, B.P., "How Do You Remove/Destroy/Extinguish Fluorescent Material in Deinked Pulp?" *Progress in Paper Recycling*, Nov. 1994, 74–79.

* cited by examiner

*Primary Examiner*—Dean T. Nguyen
(74) *Attorney, Agent, or Firm*—Woodcock Washburn LLP

(57) ABSTRACT

The present invention provides methods for reducing fluorescence in a paper-containing sample. Methods for destroying fluorescent whitening agents in a paper-containing sample are also provided.

8 Claims, No Drawings

METHODS FOR REDUCING FLUORESCENCE IN PAPER-CONTAINING SAMPLES

This Application is a divisional of application Ser. No. 09/364,459 filed Jul. 30, 1999, now U.S. Pat. No. 6,294,097 issued Sep. 28, 2001, incorporated herein by reference in its entirety.

FIELD OF THE INVENTION

The present invention relates to methods for reducing fluorescence in paper-containing samples.

BACKGROUND OF THE INVENTION

An important aspect in the manufacture of paper products is the whiteness of the paper. Traditionally, one means of increasing the whiteness of paper has been through the use of fluorescent whitening agents (FWAs). FWAs absorb light in the near ultraviolet (UV) and emit this light in the visible spectrum, thereby increasing the amount of visible light reflected from the paper, and thus increasing the apparent whiteness of the paper.

The presence of FWAs in manufactured paper, however, is limited by federal regulations, particularly in paper products destined to contact food products. Federal Regulation 21 CFR §176.260 prohibits the presence of any harmful or deleterious materials that can migrate to food products from recycled papers used for food packaging.

Recycled paper is frequently used in the manufacture of new paper products, which poses several potential problems. First, recycled paper often contains FWAs, which, as discussed above, are forbidden in products destined for food-contact. Second, recycled paper arises from many different sources and the whiteness of the final manufactured product will vary dramatically depending on the amount of FWAs present in the starting materials. Third, for optimal performance of a paper mill, processing recycled paper requires the amount of fluorescence in the pulp going to the mill to be constant. Therefore, the recycling of paper products which have been previously treated with FWAs cannot be undertaken without an effective method for destroying the FWAs (Dubreuil, Progress in Paper Recycling, 1995, August, 98–108).

The principal FWAs used in the paper industry are diaminostilbenes which have the general structure represented in Formula I:

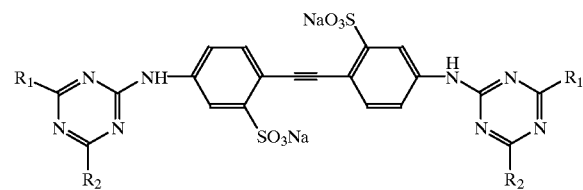

I

One common FWA is Tinopal SFP, which has the structure of Formula I wherein $R_1$ is $NH_2$ and $R_2$ is $NH(CH_2CH_2OH)$. Other potential $R_1$ substituents include, but are not limited to, $N(CH_3)(CH_2CH_2SO_3H)$, and $OCH_3$.

Other potential $R_2$ substituents include, but are not limited to, $N(CH_2CH_2OH)_2$, $NH(C_6H_4SO_3H)$, and $N(CH_3)(CH_2CH_2SO_3H)$. Other FWAs are known and have the general structure as shown in Formula II, below.

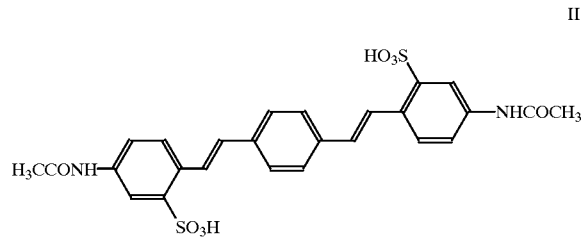

II

Several techniques are known for the removal of FWAs from recycled paper. For example, oxidizing agents, such as chlorine, destroy the stilbene dyes which make up most FWAs, rendering them nonfluorescent. The destruction of FWAs can be assessed by monitoring the fluorescence of a sample. As the FWAs are destroyed, the sample's fluorescence decreases. Increasingly stringent environmental regulation of organic halides imposes limits on such use of chlorine in the removal of FWAs from paper-containing samples.

Other non-chlorine reagents have been evaluated for their potential use in the destruction of FWAs, including sodium hydrosulfite, formadine sulfinic acid, and hydrogen peroxide; however, each of these had the reverse effect of actually increasing the measured fluorescence of the samples. Ozone has also been used as an agent to destroy FWAs. Although ozone does reduce the fluorescence of test samples, unacceptably high levels of ozone are required to reduce fluorescence. Ozone also has the undesirable effect of degrading cellulose, resulting in a paper product with decreased strength properties. These disadvantages, coupled with the high cost of ozone, make the use of ozone impracticable.

There is, therefore, a need for methods of reducing fluorescence in paper-containing samples that do not suffer from the drawbacks of existing methods. There is a further need for methods of reducing fluorescence in paper-containing samples that contain FWAs. There is also a need for improved methods of destroying FWAs in paper-containing samples.

SUMMARY OF THE INVENTION

The present invention is directed to novel methods for reducing fluorescence in paper-containing samples. According to the methods of the present invention, a paper-containing sample is combined with an oxidoreductase, a mediator, and oxygen to form a mixture, which mixture is then optionally incubated, resulting in reduction of fluorescence of the paper-containing sample.

The methods of the present invention may also be used for destroying FWAs in a paper-containing sample.

DESCRIPTION OF PREFERRED EMBODIMENTS

The present invention arises from the surprising discovery that the amount of fluorescence in a paper-containing sample may be reduced by mixing the paper-containing sample with an oxidoreductase, a mediator, oxygen, and optionally heat. The present inventors have discovered that FWAs present in a paper-containing sample may be destroyed by using this method.

As used herein, the term "fluorescence," also referred to as the fluorescent component of a sample, is expressed in terms of the number of brightness units ($°ISO$) emitted by a sample. Fluorescence is the radiation emitted as the result of the absorption of incident radiant energy of different wavelengths. When irradiated by UV, the fluorescent radiation is often visible. The higher the fluorescent component, the more fluorescence is being emitted by the sample.

As used herein, the term "reduce fluorescence," and variations thereof, are used herein synonymously with inhibit, reduce, suppress, decrease, diminish, and lower fluorescence. The present invention includes methods that substantially inhibit fluorescence. Substantial inhibition of fluorescence refers to a reduction of fluorescence from about 1% to about 100% compared to the untreated paper-containing sample comprising FWAs. Preferably, fluorescence is inhibited up to about 50%, more preferably up to about 75%, and even more preferably up to about 100% (i.e. such that the fluorescence of the treated paper-containing sample is indistinguishable from background).

As used herein, the term "background" refers to the level of fluorescence emitted by a paper-containing sample containing no FWAs. A typical paper-containing sample comprising FWAs may have a fluorescent component of about 5. Following treatment of such a paper-containing sample by the method of this invention, the fluorescence of the paper-containing sample may drop to about 1. Thus, treatment has resulted in a reduction of fluorescence in the paper-containing sample.

The fluorescent component of a paper-containing sample is obtained by measuring the brightness for a specified blue light measured under standardized conditions, with and without UV illumination, on an instrument designed and calibrated for this purpose. Brightness without UV illumination is subtracted from brightness with UV illumination, yielding the fluorescent component. $°ISO$ brightness is one of the standardized reflectivity techniques used for pulp, paper, or paperboard.

As used herein, the term "paper-containing sample" refers to a sample which contains paper. As used herein, the term "paper" refers to all kinds of sheets of fiber formed on a support screen from a water suspension and includes sheets formed by other methods. Paper may be recycled or non-recycled, and may comprise pulp from both natural and artificial sources.

As used herein, the term "recycled" refers to paper and/or paper by-products which have previously been used. "Recycled" may refer to samples containing only previously used paper and/or paper by-products as well as to samples containing previously used paper and/or paper by-products mixed with non-recycled paper. In a preferred embodiment, the "paper-containing sample" comprises recycled paper and FWAs.

As used herein, the term "pulp" refers to mechanically ground or chemically digested materials, especially wood. Paper pulps are composed of fibers and are often prepared from wood, cotton, or grasses using chemical or mechanical processes. Synthetic pulps are also known to those of skill in the art.

As used herein, the term "fluorescent whitening agent" (FWA) refers to any material which increases the brightness of a sample. "Fluorescent whitening agents" include optical brighteners (OBs), optical brightening agents (OBAs), and fluorescent brighteners (FBs). Examples of FWAs include, but are not limited to, Tinopal SFP.

In accordance with the method of the present invention, an oxidoreductase is added to paper-containing samples to reduce fluorescence and/or destroy FWAs. As used herein, oxidoreductases include, but are not limited to, laccase, manganese peroxidase (MnP), lignin peroxidase (LiP), and chloroperoxidase (CP). In an embodiment of the present invention, an oxidoreductase is added to the paper-containing sample. In another embodiment, two or more different oxidoreductases are added in combination or sequentially to the paper-containing sample according to the present method to reduce fluorescence.

Oxidoreductases may be added to the paper-containing sample at concentrations ranging from about 14,000 units (U) per gram of oven-dried pulp (O.D. pulp) to about $1.5 \times 10^6$ U per gram of O.D. pulp. In a preferred embodiment, from about 20,000 U to about 560,000 U of oxidoreductase is added per gram of O.D. pulp. In a more preferred embodiment, about 24,000 U of oxidoreductase is added per gram of O.D. pulp. In another preferred embodiment, the oxidoreductase is laccase.

As used herein, the term "oven-dried pulp" is well known to those skilled in the art and refers to the solid component of pulp that results from oven-drying a pulp sample. For example, if 4 grams of pulp are oven-dried, the weight after drying might equal 1.44 grams or 36.0% of the original pulp sample's weight. If a protocol required an amount of pulp equivalent to 20 grams of oven-dried pulp, one would add 55.6 grams of pulp sample (20 grams divided by 0.36).

A mediator is also added to the paper-containing sample to reduce fluorescence. As used herein, mediators include, but are not limited to, N—OH containing compounds. Mediators are small organic molecules which, along with optional enzyme and oxygen, are believed to be needed to oxidize the substrate. It is believed that the oxidoreductases oxidize the mediator, which becomes the active species in the system. The active species can then disrupt the fluorescence caused by the FWAs. N—OH compounds include, but are not limited to, 1-OH-Benzotriazole (HBT), N—OH-Acetanilide (NHAA), Violuric Acid (ViO; 5-(hydroxyimino) barbituric acid), N-hydroxyphtalimide, and 2-2' azinobis (3-ethylbenzthiazoline-6-sulfonate (ABTS). The chemical structures for several mediators are shown in formulas III–VII below.

III

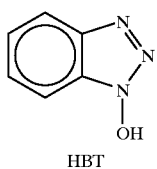

HBT

IV

H₃C—C(=O)—N—OH
         |
         Ph

NHAA

V

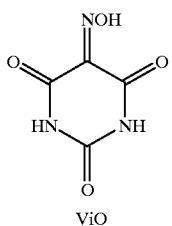

ViO

VI

ABTS

VII

N-hydroxyphthalimide

In an embodiment of the present invention, one mediator is added to the paper-containing sample. In another embodiment, mixtures of two or more different mediators are added to the paper-containing sample. In a preferred embodiment, HBT is added to the paper-containing sample at a percent charge from about 0.5% to about 10%. As used herein, the term "percent charge" refers to the amount of mediator added to the system per gram of O.D. pulp. In a more preferred embodiment, HBT is added to the paper-containing sample at a percent charge from about 1% to about 4%. In an even more preferred embodiment, HBT is added to the paper-containing sample at about a 2% charge.

In accordance with the present invention, oxygen is added to the paper-containing sample. It is believed that oxygen triggers the oxidation of the mediator by the oxidoreductase. Oxygen may be added as a gas. In an embodiment of the present invention, oxygen is added to the paper-containing sample at about 1 to about 20 bars. In a preferred embodiment, oxygen is added to the paper-containing sample at about 5 to about 15 bars. In an even more preferred embodiment, oxygen is added to the paper-containing sample at about 10 bars. Oxygen may be added to the mixture in a pressurized vessel.

As used herein, the term "mixture" refers to the combination of the paper-containing sample, the mediator, the oxidoreductase, oxygen, water, and optionally heat. The paper-containing sample may be dried prior to its inclusion in a mixture.

As used herein, the term "incubate" refers to the physical conditions to which the mixture is subjected which accomplishes a reduction of the fluorescence of the paper-containing sample. Incubation conditions include, but are not limited to, time, temperature, and pH.

In one embodiment, the pH of the mixture is from about 3.0 to about 6.5. In a preferred embodiment, the pH is from about 4.0 to about 5.0. In an even more preferred embodiment, the pH of the mixture is about 4.5.

According to the present invention, the mixture may be incubated from about 0.5 hours to about 20 hours. In a preferred embodiment, the mixture is incubated from about 1 hour to about 10 hours. In an even more preferred embodiment, the mixture is incubated for about 2 hours.

According to the present invention, the mixture may be incubated at an elevated temperature. In one embodiment of the present invention, the mixture is incubated at a temperature from about 35° C. to about 60° C. In a preferred embodiment, the mixture is incubated at about 45° C.

In an embodiment of the present invention, incubation of a mixture wherein the paper-containing sample contains FWAs results in reduction of fluorescence of the paper-containing sample.

In still another embodiment of the present invention, incubation of a mixture results in the destruction of FWAs in a paper-containing sample.

After incubation, the mixture is thoroughly washed to remove the by-products of the reaction. Subsequent operations such as extraction and/or treating the pulp with bleaching chemicals may be performed to enhance the optical properties of the pulp. Extraction and chemical bleaching are both well known to those of skill in the art.

If desired, after the method of the invention has been practiced, a paper may be formed or reformed.

The method of the present invention is further illustrated in the following non-limiting Examples. Those of skill in the art will appreciate the many other applications of the present invention as defined by the claims that follow the Examples.

EXAMPLES

Example 1

Effect of Oxidoreductase and Mediator on Fluorescence in Paper-Containing Samples.

Six separate samples were prepared to assess the effect of oxidoreductase, laccase, mediator (HBT), and oxygen on fluorescence (see Table 1). Sample One served as a control, and contained only recycled bleached softwood kraft pulp with no oxidoreductase, mediator, or oxygen. Sample Two served as a control containing the same pulp as Sample-One plus the FWA, Tinopal SFP.

TABLE 1

| Sample | Description | pulp (gm O.D.) | Temp. | O₂ (Bar) | Time (hr.) | Laccase (U/g of O.D. pulp) | HBT (% O.D. pulp) | Tinopal % charge |
|---|---|---|---|---|---|---|---|---|
| 1 | Control #1: bleached SW pulp | 20.0 | RT | 0 | N/A | 0 | 0 | 0 |
| 2 | Control #2: pulp + Tinopal | 20.0 | RT | 0 | N/A | 0 | 0 | 1 |
| 3 | Pulp + Tinopal + laccase | 40.0 | RT | 0 | 16 | 560000 | 0 | 1 |
| 4 | Pulp + Tinopal + laccase + O₂ | 40.0 | RT | 10 | 16 | 560000 | 0 | 1 |
| 5 | Pulp + Tinopal + laccase + HBT + O₂ | 40.0 | RT | 10 | 16 | 560000 | 2 | 1 |
| 6 | Pulp + Tinopal + laccase + HBT + O₂ + heat | 40.0 | 45 | 10 | 16 | 560000 | 2 | 1 |

All samples had a pH of 4.5. All samples, with the exception of Sample Six, were incubated at room temperature; sample six was incubated at 45° C. Samples 3–6 were incubated for 16 hours.

A 1000 mL capacity Parr reactor, equipped with a pressure gauge and a stirrer, was charged with 20.0 grams of fully bleached recycled softwood kraft pulp (oven dry basis). The pulp consistency was adjusted to 10% by adding distilled water to form a slurry. Consistency was calculated using the following formula well known to those of skill in the art:

(mass of O.D. pulp/(mass of the O.D. pulp+added water)

The appropriate dose of FWA was then added to the slurry. The slurry was then brought to the indicated temperature and maintained at the chosen temperature for the duration of the enzymatic treatment. The mediator HBT was purchased from Aldrich and was used as recieved. The mediator dose was added and the mixture was mixed for about 5 minutes at which time the pH was adjusted to 4.5 with glacial acetic acid. Laccase (from white rot fungi *coriolous versicolor*) was added to the mixture and mixed for an additional minute, then the reactor vessel was sealed and pressurized with oxygen (145 psig, 10 bars). At the end of the incubation period, the vessel was depressurized and the pulp mixture was filtered over a fritted glass funnel and thoroughly washed with distilled water. The treated pulp was used to prepare handsheets. The reflectance of the handsheets was measured at 457 nm with and without UV illumination, thereby allowing the calculation of the fluorescent component.

Table 2 depicts the effect of various mixture components and amounts on the fluorescence of the samples. The addition of HBT in Sample 5 caused destruction of FWAs and a resulting drop in fluorescence. A further drop in fluorescence was seen in Sample 6, which, otherwise identical to sample 5, was incubated at 45° C.

TABLE 2

| Sample | Description | UV included brightness (°ISO) | Uv excluded brightness (°ISO) | Fluorescent component (°ISO) |
|---|---|---|---|---|
| 1 | Control #1: bleached SW pulp | 89.10 | 88.94 | 0.16 |
| 2 | Control #2: pulp + Tinopal | 93.79 | 89.32 | 4.47 |
| 3 | Pulp + Tinopal + laccase | 93.67 | 87.74 | 5.93 |
| 4 | Pulp + Tinopal + laccase + O₂ | 94.00 | 88.58 | 5.42 |
| 5 | Pulp + Tinopal + laccase + HBT + O₂ | 88.05 | 86.44 | 1.61 |
| 6 | Pulp + Tinopal + laccase + HBT + O₂ + heat | 80.41 | 79.43 | 0.98 |

Example 2

Effect of Concentration of Oxidoreductase and Mediator on the Reduction of Fluoresence.

Thirteen samples were prepared as shown in Table 3 following the procedure described in Example 1 with the following variations. The samples were incubated at 45° C. for two hours at pH 4.5 and at an oxygen pressure of 10 bars. Pulp fibers were added to provide a consistency of about 10%.

After incubation of the mixtures was complete, the samples were washed, as described above, and the fluorescence of each sample was measured.

Table 3 shows the relative reduction in fluorescence of each sample compared to the control. The greatest reduction in fluorescence was observed in Sample 9 which contained 4% HBT and 560,000 units laccase per gram of O.D. pulp.

TABLE 3

| Treatment | HBT (% O.D. pulp) | Laccase (U/g of O.D. pulp) | Time (hr) | FWA (% O.D. pulp) | Pulp (grams O.D.) | Ave. Fluor. (°ISO) | Standard Deviation | % reduction in fluor. |
|---|---|---|---|---|---|---|---|---|
| Control | 0 | 0.0 | 2 | 1% | 20.0 | 3.35 | 0.23 | |
| 1 | 1 | 140000 | 2 | 1% | 20.0 | 0.49 | 0.02 | 85.37 |
| 2 | 1 | 280000 | 2 | 1% | 20.0 | 0.49 | 0.02 | 85.37 |
| 3 | 1 | 560000 | 2 | 1% | 20.0 | 0.49 | 0.02 | 85.37 |
| 4 | 2 | 140000 | 2 | 1% | 20.0 | 0.50 | 0.03 | 85.07 |
| 5 | 2 | 280000 | 2 | 1% | 20.0 | 0.41 | 0.01 | 87.76 |
| 6 | 2 | 560000 | 2 | 1% | 20.0 | 0.45 | 0.02 | 86.57 |
| 7 | 4 | 140000 | 2 | 1% | 20.0 | 0.51 | 0.02 | 84.78 |
| 8 | 4 | 280000 | 2 | 1% | 20.0 | 0.39 | 0.02 | 88.36 |
| 9 | 4 | 560000 | 2 | 1% | 20.0 | 0.28 | 0.02 | 91.64 |
| 10 | 2 | 94000 | 2 | 1% | 20.0 | 0.57 | 0.03 | 82.99 |
| 11 | 2 | 47000 | 2 | 1% | 20.0 | 0.61 | 0.03 | 81.79 |
| 12 | 2 | 24000 | 2 | 1% | 20.0 | 0.68 | 0.02 | 80.00 |

Accordingly, methods for reducing fluorescence in paper-containing samples are described. Although preferred embodiments of the subject invention have been described in some detail, it is understood that obvious variations can be made without departing from the spirit and the scope of the invention as defined by the claims which follow.

All publications, patents, and patent applications cited herein are hereby incorporated by reference in their entirety.

What is claimed is:

1. A method for destroying fluorescent whitening agents in a paper-containing sample comprising the step of incubating a mixture comprising a paper-containing sample, an oxidoreductase, a mediator, and oxygen, whereby said fluorescent whitening agents are destroyed.

2. The method of claim 1 further comprising the step of forming a paper.

3. A paper formed by the method of claim 2.

4. The method of claim 2 wherein a fluorescence of the paper-containing sample is reduced up to about 50%.

5. The method of claim 2 wherein a fluorescence of the paper-containing sample is reduced up to about 85%.

6. The method of claim 1 further comprising incubating the mixture at a temperature of about 35° C. to about 60° C.

7. A paper formed by a method of reducing fluorescence in a paper-containing sample comprising
   (a) incubating a mixture comprising the paper-containing sample, an oxidoreductase, a mediator, and oxygen; and
   (b) forming a paper.

8. A paper formed by a method of reducing fluorescence in a paper-containing sample comprising
   (a) incubating a mixture comprising the paper-containing sample, an oxidoreductase, a mediator, and oxygen;
   (b) washing and bleaching the mixture following incubation; and
   (c) forming a paper.

* * * * *